UNITED STATES PATENT OFFICE.

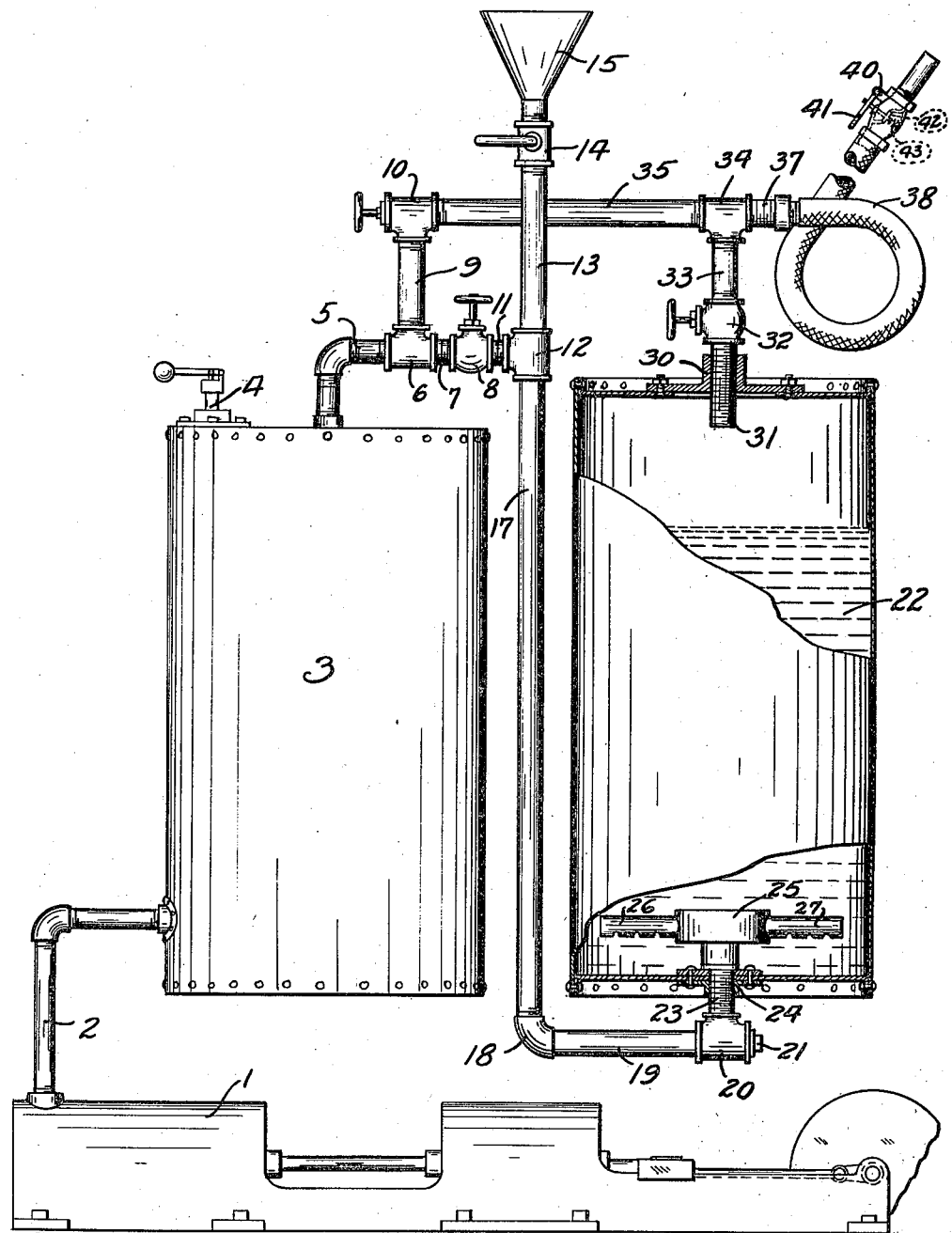

CLEMENT E. DUNN, OF BURLINGAME, CALIFORNIA, ASSIGNOR OF ONE-HALF TO WILLIAM J. HAYES, OF SAN FRANCISCO, CALIFORNIA.

PAINTING PROCESS.

1,199,734.  Specification of Letters Patent.  Patented Sept. 26, 1916.

Application filed July 28, 1915. Serial No. 42,295.

*To all whom it may concern:*

Be it known that I, CLEMENT E. DUNN, a citizen of the United States, residing at Burlingame, in the county of San Mateo, State of California, have invented a new and useful Painting Process, of which the following is a specification in such full and clear terms as will enable those skilled in the art to construct and use the same.

This invention relates to a process for covering surfaces with paint, disinfectants, or other liquid or semi-liquid substances.

While the terms "paint" and "painting" are used in this specification, those terms are to be construed generically to cover any liquid or semi-liquid substances used for coating surfaces and the term "painting" is to be applied to any such operations. Heretofore it has been customary to cover sur20 faces with a brush or by the use of compressed air atomizing the liquid used at the nozzle discharging the compressed air.

The principal object of this invention is to provide a process for covering surfaces with any liquid or semi-liquid substances by charging a body of compressed air with that substance and then allowing the compressed air to escape from a suitable discharge pipe while the same is directed to30 ward the surface or surfaces to be covered, the only paint discharged being that which is carried by the air in a state of minute subdivision, the blast of air from the air pipe resembling a thick fog when the paint is being discharged therefrom.

While the precise reason for the operation of the process and the effects produced seem to be obscure, it is assumed that the air carries the paint by some kind of a mechani40 cal admixture therewith.

In the drawing in which the same reference numeral is applied to the same portion throughout, there is illustrated an apparatus for carrying out the process.

In the drawing the numeral 1 indicates an air pump, 2 a pipe line leading to an air receiver 3. The air receiver has a safety valve 4 and a pipe line 5 leading to a T 6. The T 6 is connected by means of the nipple 7 with a valve 8 and by means of the short length of pipe 9 with a valve 10. The valve 8 is provided with a nipple 11 connected with a T 12, which T has a pipe 13, valve 14 and filling funnel 15 connected therewith.

The T 12 also has a pipe 17 connected thereto which pipe is connected with an elbow 18, in which elbow a pipe 19 is connected and which latter pipe is connected with a T 20, said pipe having a plug 21 to allow the paint receptacle 22 to be blown out whenever necessary.

A pipe 23 connects the T 21 with a flanged connection 24 on the bottom of the tank and said pipe extends far enough into the tank to receive a T fitting 25 having short pipes 26 and 27 connected therewith. The pipes 26 and 27 have openings on the lower sides thereof so that the air escaping therefrom will effectively agitate the fluid in the receptacle 22. The top of the receptacle 22 has a large flanged coupling 30 secured thereto by means of bolts so that whenever necessary the paint receptacle may be cleaned upon removing the same. The coupling 30 has a short nipple 31 connected therewith which is connected to the valve 32, said valve having a nipple 33 connected with a T 34 and which T is connected by means of the pipe 35 with the valve 10.

The T 34 has a suitable pipe connection 37 to which the flexible hose 38 is connected, said hose having a pipe 39 on its end which has a valve 40 with a hand lever 41 to open and close the same. The valve gate 42 is maintained seated normally by means of a spiral spring 43.

The operation of the process is as follows: The fluid to be applied to the surfaces is charged into the funnel 15 whereupon the valve 32 is opened and the valve 40 is opened so that the paint will run down into the receptacle 22. When the desired quantity of paint has been placed in the receptacle 22, the valve 14 is closed. When the valve 14 has been closed and the valve 40 closed, the valve 8 may be opened and pressure applied to the receptacle 22. The workman then picks up the pipe 38 and by the suitable manipulation of the handle 41 allows the air to blow off though the pipe 38, the paint being applied to any surface in the shape of a thick fog. During the time the valve 40 is opened and the air is blown therefrom the air from the air receiver will be discharged from the pipes 26 and 27 into the body of paint in the receptacle 22 and will continually keep it agitated, although the only paint that passes into the pipe 38 is such paint as is directly picked up and mechanically mixed with the body of air above the surface of the paint in the receptacle.

When it is desired to clean out the receptacle 22 the valve 8 may be closed, the valve 32 opened and the plug 21 removed from the T 20, whereupon the valve 10 may be opened and all of the material in the receptacle 22 will be blown out in a solid stream with such pressure as it may be desired to apply thereto. If it is desired merely to clean out the pipe 38 the valve 32 may be closed, the valve 8 closed and the valve 10 opened, whereupon by opening the valve 40 the pipe 38 will be cleaned by the blast of air passing therethrough.

The principal difference between this invention and other compressed air methods lies in the fact that only air carying paint, liquid or fluid in suspension is withdrawn from the receptacle. The pressure actually used in practice is from 55 to 65 pounds to the square inch, although higher pressures have been used and might be suitable where very rough surfaces are to be painted, but the invention is not limited to the precise pressure used.

I am aware that there may be many modified forms of the apparatus for carrying out this process and make no claim to such herein, but do claim as new and desire to secure by Letters Patent of the United States the following, expressly reserving all modifications thereof:

1. A process of painting which comprises charging a body of air under pressure with paint by passing air through the body of paint, and discharging air from said body of air while so charged with paint against a surface to be painted.

2. A process of painting which comprises agitating a body of paint with compressed air, maintaining a body of air under pressure when so charged with paint, and discharging air and paint from a point above the level of the paint in the receptacle containing said air under pressure against a surface to be painted.

3. A process of painting which comprises maintaining a body of paint under pressure, agitating said body of paint with compressed air, maintaining a body of said compressed air under pressure after being so charged with paint, and discharging the air charged with paint from a point in the receptacle containing the air and paint above the level of the paint against a surface to be painted.

4. A process of painting which comprises maintaining a body of paint under pressure, discharging compressed air into said body of paint to agitate the same continually when the painting operations are being effected, maintaining a body of air under pressure when so charged and discharging said air and the paint carried thereby against a surface to be painted from a point in the receptacle containing the air and paint above the level of the paint.

5. A painting process comprising maintaining a body of paint under pressure, discharging air under pressure into the body of paint to agitate the same, and discharging the air from the receptacle in which the paint is maintained under pressure from a point above the surface of the body of paint against a surface to be painted.

In testimony whereof I have hereunto set my hand this 19th day of July, A. D. 1915, in the presence of the two subscribed witnesses.

CLEMENT E. DUNN.

Witnesses:
A. H. KEPHART,
WM. E. SCHORD.